UNITED STATES PATENT OFFICE.

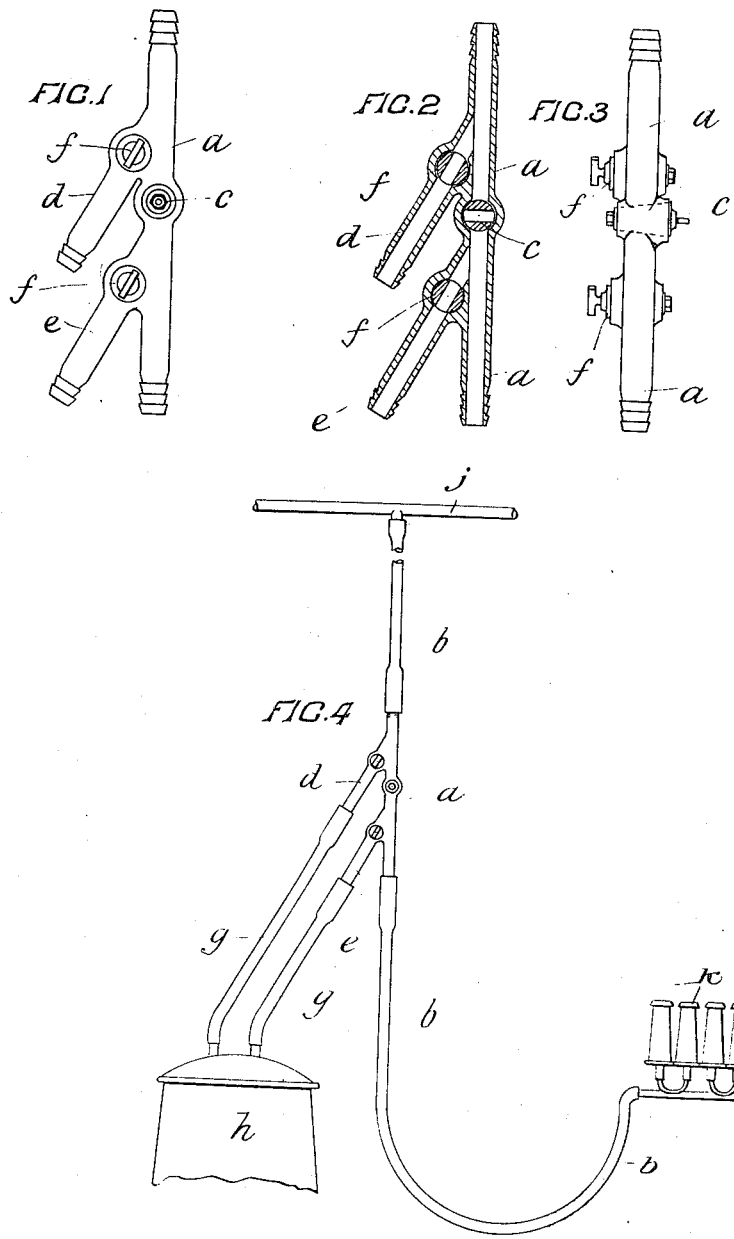

THOMAS NOTON FLETCHER, OF HAMILTON, NEW ZEALAND.

RELEASER INSTALLATION OF MILKING-MACHINES.

1,203,998.  Specification of Letters Patent. Patented Nov. 7, 1916.

Application filed July 10, 1915. Serial No. 39,084.

*To all whom it may concern:*

Be it known that I, THOMAS NOTON FLETCHER, subject of the King of Great Britain, residing at Hamilton, New Zealand, have invented new and useful Improvements Relating to Releaser Installations of Milking-Machines; and I do hereby declare the following to be a full, clear, and exact description of the same.

This invention relates to the releaser installations of milking machines and it has been designed in order to provide means whereby the milk from any particular cow may be diverted into a separate receiving can instead of being taken to the releaser apparatus.

The use of the invention provides for a cow being milked by the same vacuum line as is employed for milking all the other cows in the shed but for such milk being kept separate in order that it may be subjected to any of the usual tests. The means devised for this purpose consist generally in a device formed by a tube adapted to be interposed in each pipe line leading from the milk main to each set of teat cups, and having two branches extending therefrom adapted to be connected with a receiving vessel. A control valve is placed in the tube between the two branches and each branch is also provided with a valve. When the branch valves are closed and the main valve open, the milk will flow up through the device to the milk main in the usual way. When the branch valves are open and the main valve closed, the vacuum in the milk main acting through the upper branch will exhaust the receiving vessel before-mentioned so that the milk will flow into it through the lower branch and thus be trapped therein.

The invention is illustrated in the accompanying drawings in which:—

Figure 1 is a front elevation, Fig. 2 a sectional elevation, and Fig. 3 a side elevation of the device. Fig. 4 is a sketch view illustrating the manner of connecting the device.

The fitting or device is formed by a straight tubular portion $a$ at each end adapted to fit within the divided ends of the usual rubber down pipe $b$ (Fig. 4) for connecting up the teat cup set $k$ with the overhead milk-vacuum main $j$. A valve $c$ is arranged about midway in its length such valve being of any ordinary type suitable for fully opening or closing the way through the tube. Branches $d$ and $e$ are made to open from the tube $a$ such branches being situated one above and one below the valve $c$ and each being formed at its end to receive a flexible or other pipe connection. Each branch is also provided with a valve $f$ controlling the passage through it. These branches are adapted to be connected by flexible or other pipes $g$ (Fig. 4) with an airtight receiver $h$ of suitable construction and to facilitate such connection, are preferably arranged to extend at a downward incline from the tube $a$. In ordinary use, the valve $c$ is open and the valves $f$ closed. The milk will thus flow right through the tube $a$ and the pipe $b$ in the ordinary manner. Should it be required to separately retain the milk for any purpose the branches $d$ and $e$ are connected up with the receiver $h$ and the valve $c$ is closed and the valves $f$ opened, as shown in Fig. 2. The vacuum will then act through the branch $d$ down through the receiver $h$ to divert the milk flow down the branch $e$ into the receiver. The device may be made in any other approved form to adapt it for special circumstances and classes of milking machinery.

I claim:—

1. In milking machine installations, the combination with the teat cup branch from the milk vacuum main, of a device consisting of a main tube interposed in such branch and having a valve controlling the passage through it, and two tubular branches leading from such main tube on respectively opposite sides of the valve and each provided with a control valve, substantially as specified.

2. In milking machine installations, the combination with the teat cup branch from the milk vacuum main of a device interposed therein consisting of a main tube extending longitudinally with such branch and having a valve controlling the passage therethrough, and provided with two tubular branches leading from respectively opposite sides of the control valve and each provided with a control valve, and a receiver with which such branches are connected, substantially as specified.

In testimony whereof, I have signed this specification in the presence of two subscribing witnesses.

THOMAS NOTON FLETCHER.

Witnesses:
 EDWARD BROOKE SMITH,
 ETHEL FRANCES COURTNEY.